United States Patent [19]
Johnson

[11] 3,882,382
[45] May 6, 1975

[54] INSULATED CONDUIT COVER AND LEAK DETECTOR

[75] Inventor: Lowell Johnson, Chicago, Ill.
[73] Assignee: Transco Inc., Chicago, Ill.
[22] Filed: Sept. 7, 1972
[21] Appl. No.: 286,896

[52] U.S. Cl............. 324/65 R; 73/49.1; 200/61.05; 340/242
[51] Int. Cl............................................ G01r 27/02
[58] Field of Search................. 324/65 R; 340/242; 73/49.1; 200/61.05

[56] References Cited
UNITED STATES PATENTS

| | | | |
|---|---|---|---|
| 2,691,134 | 10/1954 | Ford.................... | 324/65 R |
| 3,098,116 | 7/1963 | Jore et al................ | 340/242 X |
| 3,382,493 | 5/1968 | Loper, Jr. et al......... | 340/242 X |
| 3,383,863 | 5/1968 | Berry.................... | 340/242 X |
| 3,485,085 | 12/1969 | Hawkins, Jr............. | 324/65 R X |
| 3,721,970 | 3/1973 | Niemoth................. | 340/242 |

FOREIGN PATENTS OR APPLICATIONS

| | | | |
|---|---|---|---|
| 1,377,519 | 9/1964 | France................... | 340/242 |
| 1,126,686 | 3/1962 | Germany................. | 340/242 |

Primary Examiner—Stanley T. Krawczewicz
Attorney, Agent, or Firm—Edward C. Threedy

[57] ABSTRACT

A conduit cover prefabricated into complementary insulated ring sections each including an outer metallic cover plate and an electrically conductive metal mesh and an encapsulated insulating mat, with the electrically conductive metal mesh electrically energized and responsive to penetrating moisture from the conduit for completing an electric circuit between the outer metallic cover plate and the metal mesh so as to detect a leak in the conduit.

4 Claims, 7 Drawing Figures

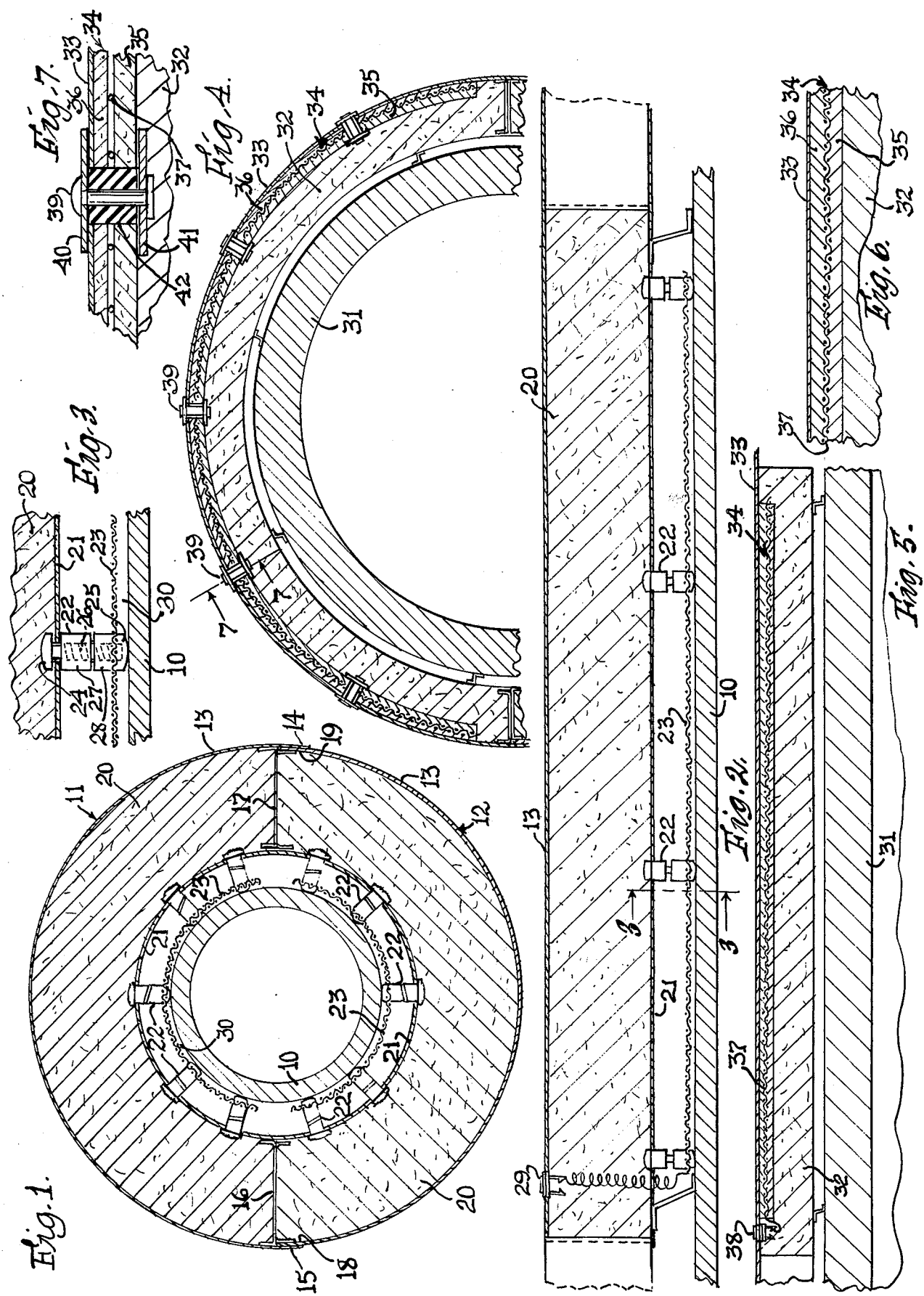

INSULATED CONDUIT COVER AND LEAK DETECTOR

SUMMARY OF THE INVENTION

A leak detecting insulating conduit cover having an outer protective metallic cover plate, an insulating panel, and a metal mesh electrically isolated from the other components by suitable insulators that function as spacing members and component holding members; the outer protective metallic cover plate being preformed into ring-like sections of a size to accommodate the conduit to be protected as well as forming a retainer for the electrically conductive metal mesh and the insulation; the metal mesh being constantly energized so as to be "hot" and the outer metallic cover plate together with the conduit being commonly grounded; the arrangement being such that moisture leaking out of the conduit and bridging the gap between the metal mesh and the outer metallic cover plate will complete a circuit that can be by proper instrumentation associated with an alarm or indicating signal.

GENERAL DESCRIPTION

The invention will be best understood by reference to the accompanying drawings, in which there is shown the preferred form of embodiment, and in which:

FIG. 1 is a detailed sectional view of the improved insulated conduit cover and leak detector;

FIG. 2 is a complementary detailed sectional view of the components of the invention;

FIG. 3 is an enlarged fragmentary detailed sectional view taken on line 3—3 of FIG. 2;

FIG. 4 is a fragmentary detailed sectional view of a modified form of insulated conduit cover and leak detector;

FIG. 5 is a fragmentary detailed sectional view of the modified invention;

FIG. 6 is an enlarged detailed fragmentary sectional view of a portion of the invention shown in FIG. 5; and FIG. 7 is a fragmentary detailed sectional view taken on line 7—7 of FIG. 4, to enlarged scale.

The principal object of the invention hereinafter described relates to an insulated cover for a pipe or conduit through which a heat transfer liquid is adapted to be passed, with the cover providing electrical components responsive to the presence of moisture for detecting any incipient leaks in the pipe or conduit.

In a system wherein the heat transfer medium is in itself a good electrical conductor, such as liquid sodium, the protective panel and leak detector comprises the components shown in FIGS. 1 through 3.

Referring to FIG. 1, there is shown a pipe or conduit 10, the periphery being covered by a ring-like structure formed of complementary sections 11 and 12, each of which is of like construction. The section 11 has an outer metallic cover sheet 13, the ends 14 and 15 of which are adapted to overlap I-beam supports 16 and 17 as well as the complementary ends 18 and 19 of the metallic cover sheet 13 of the section 12. Beneath the outer metallic cover sheet 13 of the sections 11 and 12 is an encapsulated insulating mat 20 of any suitable density and thickness. The insulating mat 20 includes an inner arcuate metal base 21 which forms a base support for electrical insulating spacers 22. These electrical insulating spacers 22 carry in spaced relation to the insulating mat 20 and pipe 10, a metallic mesh detector plate 23.

Each of the electrical insulating spacers 22 provides end caps 24 and 25 positioned upon a threaded stud 26 which carries thereon threaded bushings 27 and 28. As shown in FIG. 3, the cap 24 of the spacer 22 will be disposed to one side of the plate 21, and the bushing 27 disposed to the opposite side thereof and threaded upon the stud 26 until it frictionally holds the plate 21 between the cap 24 and the bushing 27. The opposite cap 25 is disposed to one side of the metal mesh 23, and the bushing 28 is disposed on the opposite side thereof and threaded in the direction of the cap 25 on the stud 26 until it retains the mesh 23 therebetween.

Thus, the insulating spacer 22 maintains the insulating mat 20 as well as the metallic mesh plate 23 in spaced insulated relation with respect to each other as well as to the outer surface of the pipe or conduit 10.

By any suitable electrical connector 29, which may be of the plug or screw type and which is suitably carried by the outer metallic cover sheet 13, the metallic mesh is connected to an electrical supply source. The conduit or pipe 10 as well as the opposite terminal of the electrical connector 29 may be commonly grounded. Any moisture which penetrates through the conduit or pipe 10 will bridge the air gap 30 between the outer surface of the pipe 10 and the hot metallic mesh 23 to complete the circuit therebetween so that the same may be by proper instrumentation, which is not a part of this invention, energized to indicate the presence of such a defect or leak in the conduit 10.

When the invention is to be used in conjunction with a conduit or pipe in which water or steam comprises the heat transfer liquid, then the construction shown in FIGS. 4 through 7 is employed. Referring to FIG. 4, the conduit or pipe is indicated at 31 and is surrounded by a suitable mat of encapsulated insulating material 32. An outer protective metallic cover sheet 33 encircles the insulating mat 32 as well as a detector panel 34.

The detector panel 34 comprises an inner fibrous protective jacket 35 as well as an outer protective fibrous jacket 36, both of which are compressed upon a metallic mesh 37. The outer protective jacket 36 is impregnated with a dry electrolyte for a purposes hereinafter made apparent. The metallic mesh 37 is suitably connected to an electrical connector 38 so that it too is in an electrically energized or "hot" condition and, as such, requires that it be isolated from the outer protective cover 33.

Referring to FIG. 7, there is shown an insulated panel hold-down which comprises a rivet 39 having its one head exposed externally of the cover sheet 33, and washers 40 and 41 disposed to the outer and inner wall surfaces of the cover sheet 33 and the inner protective jacket 35. About the shank portion of the rivet is disposed an electrical insulating sleeve 42 which electrically isolates the "hot" metallic mesh 37 from the outer metallic panel cover sheet 33. The outer metallic panel sheet 33 together with the pipe, may be commonly grounded so as to become a part of the electrical circuit, such that when a leak occurs in the pipe or conduit 31 and such leak penetrates to the mesh 37 and moistens the dry electrolyte and impregnated outer protective jacket 36, a circuit is completed which, by proper instrumentation, will indicate such defective condition.

From the foregoing, it is obvious that I have provided a highly effective conduit cover and leak detector wherein certain components are electrically connected to one side of a power source and, when a leak occurs, cooperates with a fluid and the outer conduit cover to complete a circuit to so indicate such a condition.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. An insulated conduit cover and leak detector comprising prefabricated complementary ringlike sections with each ringlike section including
   a. an outer metallic cover plate,
   b. an encapsulated mat of insulating material within said cover plate,
   c. a current conductive member between said cover plate and said conduit to be covered thereby,
   d. spacer means connected between said current conductive member and said cover plate and in contact with the conduit for separating and electrically insulating said current conductive member from said cover plate and from the conduit covered thereby, and
   e. electrical means connecting in open circuit said current conductive member, said cover plate, and said conduit and responsive to the escape of moisture through said conduit to close the circuit therebetween.

2. An insulated conduit cover and leak detector as defined by claim 1, wherein said current conductive member comprises a metallic mesh.

3. An insulated conduit cover and leak detector as defined by claim 1 wherein said means for electrically insulating said current conductive member and said cover plate from said conduit comprises insulating supports connected to and positioning said current conductive member in spaced relation to said metallic cover plate and said conduit, with said insulating support adjustable so as to vary the open circuit gap between said current conductive member and said conduit.

4. An insulated conduit cover and leak detector as defined by claim 2 wherein said means for electrically insulating said current conductive member from said cover plate comprises insulating supports carried by said metallic mesh in spaced relation to said cover plate and said conduit with said insulating supports being adjustable so as to vary the open circuit gap between said metallic mesh and said conduit.

* * * * *